July 12, 1932.     A. JOHNSON ET AL     1,867,266
CHUCK
Filed Jan. 17, 1930
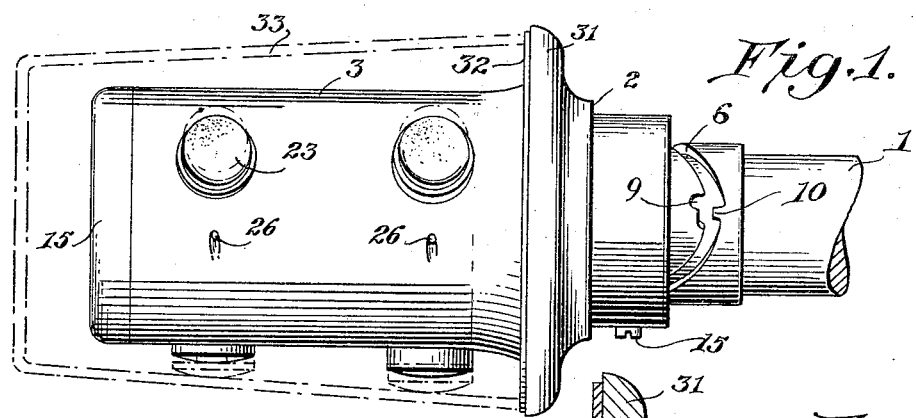
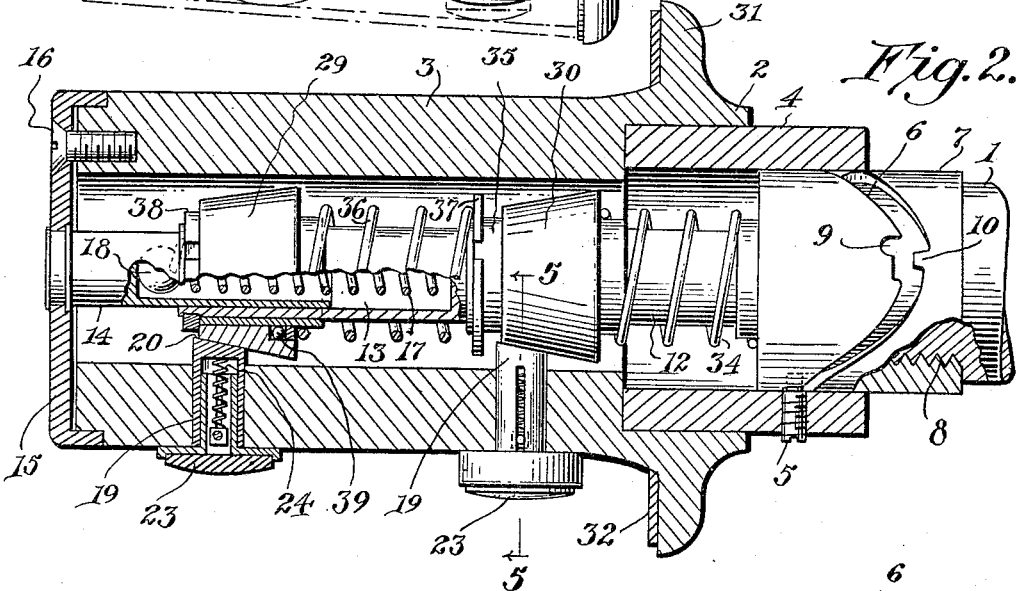
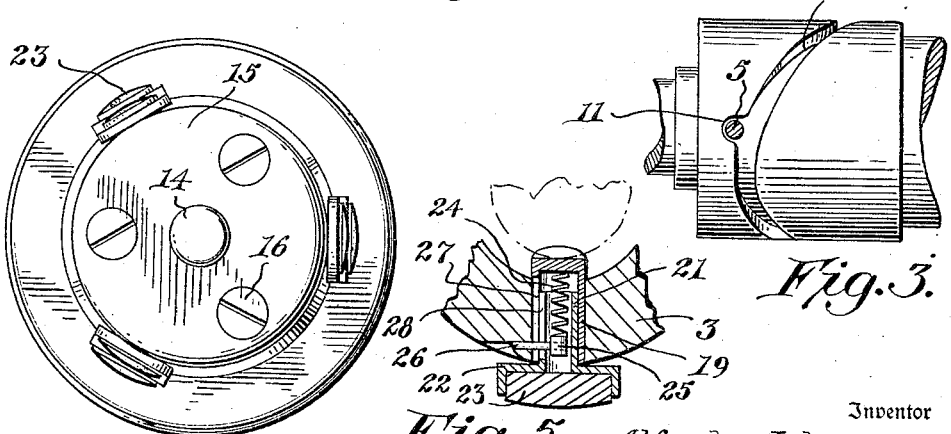
Fig.4.   Fig.5.
Inventor
Alfred Johnson
Robert H. Johnson
By Eccleston & Eccleston
Attorneys Patented July 12, 1932

1,867,266

UNITED STATES PATENT OFFICE

ALFRED JOHNSON, OF UNIONTOWN, PENNSYLVANIA, AND ROBERT H. JOHNSON, OF MORGANTOWN, WEST VIRGINIA, ASSIGNORS TO MAKERAS, INC., OF FAIRMONT, WEST VIRGINIA, A CORPORATION OF WEST VIRGINIA

CHUCK

Application filed January 17, 1930. Serial No. 421,462.

This invention relates to chucks and while intended for use generally as a work holder for any type of hollow articles is primarily designed for holding glassware such as tumblers, goblets and the like, during the cutting or grinding of ornamental configurations on the surface thereof.

One of the objects of the invention consists in the provision of a chuck having a plurality of work-engaging grippers which are independently and automatically adjusted to grip the ware with a predetermined pressure.

Another object of the invention resides in the provision of a chuck having two or more sets of axially spaced grippers which are independently adjustable to provide a predetermined grip upon the ware irrespective of the general taper or configuration of the walls of the ware.

A further object of the invention consists in providing a chuck which is caused to automatically grip or release the ware as pressure is applied to the latter during the rotation of the chuck.

Other objects and advantages of the invention will be apparent from the following description when taken in connection with the accompanying drawing; in which Figure 1 is a side elevational view of the chuck with a tumbler shown in position thereon in dotted lines.

Figure 2 is a longitudinal sectional view through the device.

Figure 3 is a detail elevational view of the spindle showing a portion of the cam groove.

Figure 4 is an end view of the chuck; and

Figure 5 is a sectional detail taken on line 5—5 of Figure 2.

Referring to the drawing in greater detail the numeral 1 indicates a shaft on a grinding or cutting machine for producing ornamental configurations on the surface of glassware. Such machines usually employ a plurality of such shafts and in the present invention each shaft is provided with a chuck or work holder which is indicated generally by the numeral 2. The chuck includes a body portion 3 which is rigidly connected to a sleeve 4 through the inner wall of which extends a pin 5. This pin 5 has its inner end seated in a cam groove 6 which extends entirely around a boss 7 rigidly connected to the shaft 1, as by threads 8. This cam groove 6 is provided with a locking recess 9 at its innermost point for the purpose of releasably locking the chuck in its innermost position, and in order that the pin 5 may be projected into the groove 9 a stop 10 is provided for halting the rotary movement which may be imparted to the chuck. Likewise, when the chuck is released from the groove 9 and is extended to its outermost position in a manner to be hereinafter described it is releasably locked against rotation in its outermost position by means of a groove 11 formed at the outermost point of the cam groove 6.

A shaft 12 is rigidly connected to the outer end of shaft 1 and extends axially of the hollow body portion 3 of the chuck. The outer portion of the shaft 12 is hollow as indicated by numeral 13 and its outer end slidably receives an extension member 14 which forms a bearing for the outer end of the body portion 3. In this connection it is to be noted that the body 3 is provided at its outer end with a cap 15 which is secured to the body by means of screws 16. This cap is provided with a central opening in which is fixed the outer end of the extension member 14.

For the purpose of projecting the chuck into its forward position a compression spring 17 is provided. This spring is received within the hollow portion 13 of shaft 12 and has one end seated at the base of this hollow portion and its other end engages a ball 18 which rests upon the base of the extension portion 14 of the shaft. It will be apparent, therefore, that this spring serves to resiliently hold the body portion 3 of the chuck in its extended position with the pin 5 seated in the groove 11 of the cam track 6. Obviously, by applying an inward pressure on the body portion 3 the pin 5 will ride out of the groove 11 and in traveling around the cam track 6 will impart a rotary movement to the chuck body 3 until such time as the pin engages the stop 10. Pressure then being released from the chuck body, the spring 17 will throw the chuck outwardly and cause the pin 5 to seat in the groove 9 and thus lock the chuck against rotative movement relative to the boss 7.

As already mentioned, this chuck is intended as a work holder for glassware or other hollow work and to this end the chuck is provided with a plurality of radially extending grippers. In the present embodiment of the invention two series of grippers are disclosed, one series comprising three grippers being located adjacent the forward end of the chuck body and the other series comprising three grippers located adjacent the rear end of the chuck body. The number of grippers in each series as well as the number of series may, of course, be varied as desired.

These grippers comprise a sleeve or plunger member 19 having a slightly beveled inner end 20. Mounted within each sleeve 19 is a hollow tube 21 provided with an outer flanged cap member 22 in which is seated a rubber disk or the like 23 adapted to engage the inner wall of the glassware or other piece of hollow work. These plungers together with their tubes and cushion disk 23 are normally held in retracted or inner position by means of a coil spring 24, which has its inner end bearing on the base of the hollow sleeve or plunger 19 and its outer end bearing against the head 25 of a pin 26. This pin is driven more or less tangentially through the body portion 3 and has its inner end located within the tubular member 21. Obviously, in order that the plunger may be allowed to reciprocate readily the same is provided with a slot 27 and likewise the sleeve 19 is provided with a slot 28, and it is through these slots that the pin 26 extends into engagement with the outer end of the spring 24.

It is intended that the chuck shall operate automatically to grip the ware when the ware is pressed thereagainst, and to this end wedge members 29 and 30 are provided on the shaft 12. Also, the body member 3 is provided with a flange 31 on which is seated an annular member 32 of rubber, felt or the like and against which the inner end of the hollow ware 33, as indicated in dotted lines in Figure 1, is adapted to seat. The pressure of the work against the member 32 will cause the chuck to ride about the cam track 6 and into the groove 9 as heretofore described, and in so doing the wedge members 29 and 30 will project the grippers outwardly in a manner to be described.

The wedge members 29 and 30 are of annular construction and are slidably mounted on the shaft 12; each wedge member being properly positioned for cooperation with one of the two sets of grippers. The inner wedge member 30 is projected forwardly by means of a coil spring 34 which has its outer end bearing against the wedge member and its inner end bearing against the boss 7. The outward movement of the wedge member 30 is limited by a shoulder 35 on the shaft 12. Likewise the outer wedge member 29 is normally pressed outwardly by means of a coil spring 36 surrounding the shaft 12 and having its inner end in engagement with a snap ring 37. The outer end of this spring 36 engages the base of the wedge member 29 and the outer limit of movement of the wedge member is fixed by a snap ring 38 secured to the shaft. Movement of the wedge members 29 and 30 is facilitated by ball bearings 39 as indicated in Figure 2.

As is well understood by those skilled in the art, the taper in drinking glasses varies considerably. Also, the general shapes of glassware, such as goblets and the like, vary between wide limits, and it is the purpose of this invention to provide a more or less universal chuck which will be capable of firmly gripping these various shapes of glassware without liability of breakage, irrespective of whether the glassware is of the heavy pressed type or the light and fragile shell ware, such as fancy goblets and the like. To this end the present construction is intended to provide not only an independent action between the several grippers of each series, but also to provide what may be termed a differential action between the grippers of each series. This result is obtained by reason of the springs 24 which force the plungers inwardly and the separate springs 34 and 36 which force the wedge members 29 and 30 outwardly. For instance, if a drinking glass of a diameter adjacent its bottom small enough to engage the outer series of grippers when in their innermost position is placed on the chuck and the chuck forced inwardly, then as the chuck begins its inner movement the predetermined pressure desired for gripping the glass will be placed on the springs 24, and after this pressure is reached sufficient friction will be caused between the beveled end 20 of each gripper and the beveled surfaces of the wedge 29 to cause the latter to be carried inwardly against the pressure of spring 39; the strength of this spring being such as to permit this inner movement of the wedge member when the desired gripping action is produced on the ware. Also, in connection with the wedge member 30, after the predetermined gripping action is created in the grippers by riding up on the wedge member 30 the latter will be carried inwardly against the pressure of spring 34 by reason of the friction between the inner ends of the grippers and the tapered surfaces of the wedge members.

It will thus appear that the action of the individual grippers of each series is entirely independent of each other and that the action of each series of grippers is entirely independent and provides a differential action such as will permit the gripping of various shapes and sizes of glassware with a predetermined pressure at both the inner and outer ends thereof without liability of breakage.

While the action of the several parts of the apparatus have been touched upon in the description of the details of the construction, it is believed desirable to briefly describe the general operation of the complete device. As will be understood by those familiar with the operation of grinding devices with which the present invention is concerned, the shaft 1 is continuously rotating, and likewise the chuck 2 carried thereby. In describing the operation of the device it will be assumed that the chuck is in its outermost position as shown in Figure 2, and is locked against relative movement with respect to the boss 7 by reason of the pin 5 being held in the locking groove 11 of cam track 6 by the pressure of the spring 17. The operator now places a drinking glass, such as a tumbler or goblet, over the chuck body 3 until the mouth thereof engages the annular member 32 and then presses the ware inwardly carrying with it the body member 3 of the chuck. As pressure is applied to the friction member 32 on the flange 31 of the body member it tends to slow down the movement of the chuck with respect to the shaft 1, and at the same time move the pin 5 out of its locking groove 11. This action will cause the pin 5 to ride up the cam track 6 until it engages the stop 10, at which time the operator releases pressure on the piece of work and the spring 17 will force the chuck body outwardly so as to cause the pin 5 to seat in its locking groove 9, thus again locking the chuck against relative rotary movement with respect to the shaft 1.

In this inward movement of the chuck body the several grippers are, of course, also carried inwardly and in this movement are caused to ride up the surfaces of the wedge members 29 and 30, which thereby projects the grippers outwardly against the pressure of their respective springs 24. This outward radial movement of the grippers continues until such time as each set of grippers exerts a predetermined pressure on the inner wall of the piece of work. When this pressure is reached the grippers of the particular series will be pressing upon the particular wedge member with such force as to cause the wedge member to be carried inwardly against the pressure of its spring. It is this differential action of the two series of wedge members which will allow the most delicate piece of ware to be properly gripped for the purpose of grinding the desired design thereon without liability of breakage due to excess pressure.

After the grinding or cutting operation on the particular piece of ware is completed the operator merely presses inwardly on the ware slightly so as to cause sufficient compression on the spring 17 to project the pin 5 out of its locking groove 9. The rotation of the shaft then carries the pin in the same circumferential direction through the cam track 6 until the pin again reaches its locking seat 11, at which time the chuck body 3 has been carried outwardly to its original position and the springs 24 have forced the grippers inwardly to the positions shown in Figure 2, at which positions the piece of work is released and may be removed. The chuck is now ready for the reception of another piece of ware, and the operation just described is again repeated.

From the foregoing description taken in connection with the accompanying drawing it will be observed that we have devised a chuck for glassware and the like of fairly simple construction; that it is so designed as to be automatically operable through the instrumentality of the work being placed upon or taken off of the chuck; that it is automatically locked through the rotative movement of the shaft in either its inner or outer position; that the grippers are automatically operated through the movements of the chuck body; and that the grippers are provided with a differential action which permits the chuck to be employed with articles of varying shapes and sizes and of relatively fragile construction without liability of damage.

In accordance with the patent statutes we have described what we now believe to be the preferred form of the invention, but inasmuch as it is obvious that various changes may be made in the details of the construction without in any way departing from the essential features of the invention, it is desired that all such changes be included within the scope of the appended claims.

What we claim as new and desire to secure by Letters Patent is:

1. A chuck including a shaft, a body portion slidably mounted on said shaft, a plurality of radially movable grippers mounted in the body portion, means for moving said grippers to operative position as the body portion is moved inwardly, and means for automatically locking the body portion in its inner position.

2. A chuck including a shaft, a body portion slidably and rotatably mounted on said shaft, a plurality of radially movable grippers mounted in the body portion, means for moving the grippers to operative position as the body portion is moved inwardly, means for locking said body portion in its inner position, and means for automatically rotating the body portion into engagement with said locking means.

3. A chuck including a shaft, a body portion slidably and rotatably mounted on said shaft, a plurality of grippers mounted in the body portion, means for moving the grippers to operative or inoperative position in accordance with the axial movement of said body portion, a cam groove for rotating the body portion as it is moved inwardly or outwardly on said shaft, a pin riding in said groove, and a notch formed in a wall of said groove for locking the body portion in its inner position.

4. A chuck including a shaft, a body portion slidably and rotatably mounted on said shaft, a plurality of grippers mounted in the body portion, means for moving the grippers to operative or inoperative position in accordance with the axial movement of said body portion, a cam groove for rotating the body portion as it is moved inwardly or outwardly on said shaft, a pin riding in said groove, and notches formed in a wall of said groove for locking the body portion in its inner position and for preventing relative rotation between the shaft and body portion when the body portion is in its outer position.

5. A chuck including a shaft, a body portion slidably mounted on said shaft, movably mounted grippers carried by said body portion, and differential means for causing said grippers to engage the work with a predetermined pressure when the body portion is moved inwardly.

6. A chuck including a shaft, a body portion slidably mounted on said shaft, two series of movably mounted grippers carried by said body portion and spaced longitudinally thereof, and independent differential means for causing each of said series of grippers to engage the work with a predetermined pressure when the body portion is moved inwardly.

7. A chuck including a shaft, a hollow body portion slidably mounted on the shaft, spring-pressed grippers mounted in said body portion, a wedge member slidably mounted on said shaft in cooperative relation with said grippers, and springs normally holding said body portion and wedge members at their outer limits of movement.

8. A chuck including a shaft, a hollow body portion slidably mounted on the shaft, spring-pressed grippers mounted in said body portion, independent wedge members slidably mounted on said shaft in cooperative relation with said grippers, and springs normally holding said body portion and wedge members at their outer limits of movement.

9. A chuck including a shaft, a hollow body portion slidably mounted on the shaft, a gripper mounted in said body portion for movement radially thereof, a spring normally holding said gripper in retracted position, a wedge member slidably mounted on said shaft in cooperative relation with the inner end of said gripper, springs normally holding the body portion and wedge member at their outer limits of movement, the cooperative relation of the wedge member and gripper being such as to cause a movement of the wedge member against its spring after a predetermined pressure is applied to the gripper.

10. A chuck including a shaft, a hollow body portion slidably mounted on the shaft, two series of radially movable grippers on said body portion, said series being spaced longitudinally, springs normally biasing said grippers inwardly, slidably mounted wedge members on said shaft in cooperative relation to the inner ends of said grippers, and springs normally holding said body portion and said wedge members at their outer limits of movement.

ALFRED JOHNSON.
ROBERT H. JOHNSON.